United States Patent
Gikas

(10) Patent No.: US 11,157,939 B2
(45) Date of Patent: Oct. 26, 2021

(54) SYSTEM AND METHOD FOR PROVIDING CREDITS FOR RIDESHARING

(71) Applicant: Freerydz Inc., Etobicoke (CA)

(72) Inventor: George Gikas, Etobicoke (CA)

(73) Assignee: Freerydz Inc., Etobicoke (CA)

( * ) Notice: Subject to any disclaimer, the term of this patent is extended or adjusted under 35 U.S.C. 154(b) by 0 days.

(21) Appl. No.: 16/836,891

(22) Filed: Mar. 31, 2020

(65) Prior Publication Data

US 2021/0304244 A1 Sep. 30, 2021

(51) Int. Cl.
*G06Q 30/02* (2012.01)
*G06Q 50/30* (2012.01)
*G06Q 20/14* (2012.01)

(52) U.S. Cl.
CPC ....... *G06Q 30/0235* (2013.01); *G06Q 20/145* (2013.01); *G06Q 30/0261* (2013.01); *G06Q 30/0272* (2013.01); *G06Q 50/30* (2013.01)

(58) Field of Classification Search
CPC ........... G06Q 30/0235; G06Q 30/0261; G06Q 20/145; G06Q 50/30; G06Q 30/0272
USPC .......................... 705/5, 1.1, 7.15, 14.35, 26.1
See application file for complete search history.

(56) References Cited

U.S. PATENT DOCUMENTS

| | | | |
|---|---|---|---|
| 2008/0082424 A1* | 4/2008 | Walton | G06Q 30/02 705/26.1 |
| 2010/0207812 A1* | 8/2010 | Demirdjian | G06Q 30/08 705/1.1 |
| 2013/0054281 A1* | 2/2013 | Thakkar | G06Q 50/30 705/5 |
| 2015/0254581 A1* | 9/2015 | Brahme | G06F 16/29 705/5 |

(Continued)

FOREIGN PATENT DOCUMENTS

WO   WO-2004001541 A2 * 12/2003 ......... G06Q 30/0267

OTHER PUBLICATIONS

Wharton School, Why Ridesharing Reaps Unexpected Benefits, 2019 (Year: 2019).*

(Continued)

*Primary Examiner* — Tarek Elchanti
(74) *Attorney, Agent, or Firm* — Orin Del Vecchio

(57) ABSTRACT

The present invention relates to a method of providing credits for ridesharing to a user, comprising: detecting a request by the user for a ridesharing trip provided by a rideshare provider; associating, with the request, a user location, a pickup location and a destination location; allocating one or more advertisement messages based on at least one of the user location, the pickup location and the destination location; providing the one or more advertisement messages to the user for viewing on a user device during an eligibility period; confirming viewing of at least one of the one or more advertisement messages during the eligibility (Continued)

period; calculating a rideshare credit amount based on the confirmed viewing; and providing the rideshare credit amount to the user, wherein the eligibility period includes the duration of the rideshare trip. The rideshare credit amount is preferably a travel distance measurement (e.g. kilometers) which is then deducted from the rideshare trip distance to determine an adjusted final monetary amount owed by the user for the rideshare trip.

17 Claims, 3 Drawing Sheets

(56) References Cited

U.S. PATENT DOCUMENTS

| | | | |
|---|---|---|---|
| 2016/0034845 A1* | 2/2016 | Hiyama | G06Q 30/0633 705/7.15 |
| 2020/0349666 A1* | 11/2020 | Hodge | G01C 21/3438 |
| 2020/0410555 A1* | 12/2020 | ElShenawy | G06Q 50/30 |

OTHER PUBLICATIONS

Paula Gibbins, Best Rideshare Advertising Companies To Make More Money, 2019 (Year: 2019).*

* cited by examiner

SYSTEM AND METHOD FOR PROVIDING CREDITS FOR RIDESHARING

FIELD OF THE INVENTION

The present specification relates generally to systems and methods of ridesharing, and more particularly to a system and method of providing credits for ridesharing through advertising.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

The rapid proliferation of ridesharing services has created a new market of users of these services. In addition to the basic commercialization by the ridesharing providers, the creation of this new user base presents a commercial opportunity for a variety of other parties through leveraging of the ridesharing concepts and platforms.

However, the wide variability of ridesharing, while providing a benefit to the users, presents a detriment to other parties seeking commercial opportunities. In particular, traditional membership and rewards programs have proven unsuitable for application to existing ridesharing models. Relatedly, the wide range of service options and user motivations for user of ridesharing services has created a user demand for a new type of rewards and membership programs that reflects this range.

While there may be existing rewards programs known in the art, it would be desirable to have a membership and rewards system which mitigates some of the disadvantages and addresses some of the differences created by the ridesharing model.

Accordingly, there remains a need for improvements in the art.

SUMMARY OF THE INVENTION

In accordance with an aspect of the invention, there is provided to a system and method of providing credits for ridesharing through advertising.

According to an embodiment of the invention, there is provided a method of providing credits for ridesharing to a user, comprising: detecting a request by the user for a ridesharing trip provided by a rideshare provider; associating, with the request, a user location, a pickup location and a destination location; allocating one or more advertisement messages based on at least one of the user location, the pickup location and the destination location; providing the one or more advertisement messages to the user for viewing on a user device during an eligibility period; confirming viewing of at least one of the one or more advertisement messages during the eligibility period; calculating a rideshare credit amount based on the confirmed viewing; and providing the rideshare credit amount to the user, wherein the eligibility period includes the duration of the rideshare trip. The rideshare credit amount is preferably a travel distance measurement (e.g. kilometers) which is then deducted from the rideshare trip distance to determine an adjusted final monetary amount owed by the user for the rideshare trip.

The rideshare credit amount may be allocated for use with the rideshare provider or may be exchanged for another rideshare credit amount for use with another rideshare provider. The eligibility period may further include one or more of: user's travel time from the user location to the pickup location; a designated time period after the rideshare trip; and a designated period before the rideshare trip. The designated time period after the rideshare trip may be determined by the rideshare provider.

The rideshare credit amount may be applied to the rideshare trip at the time the rideshare credit amount is awarded. Alternatively, the rideshare credit amount may be stored in a credit bank associated with the user or with the user and the rideshare provider.

According to a further embodiment of the invention, the method may further comprise detecting a second request from a second user for a second rideshare trip; associating, with the second request, a second user location, a second pickup location and a second destination location; allocating one or more advertisement messages based on at least one of the second user location, the second pickup location and the second destination location; providing the one or more advertisement messages to the user for viewing on a second user device during an eligibility period; confirming viewing of at least one of the one or more advertisement messages during the eligibility period; calculating a rideshare credit amount based on the confirmed viewing; and providing the rideshare credit amount to the second user, wherein the eligibility period includes the duration of the second rideshare trip, and wherein the second rideshare trip is partially overlapping with the rideshare trip and is fulfilled by the same rideshare vehicle. Additionally, the rideshare trip and the second rideshare trip may share one of a common pickup location and a common destination location For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which.

DETAILED DESCRIPTION OF THE EMBODIMENTS

The present invention relates to systems and methods for providing a user with reward credits and, in particular, a system and method for providing a user with reward credits for ridesharing providers based on user viewing of advertisements during rideshare trips.

Figure 1:
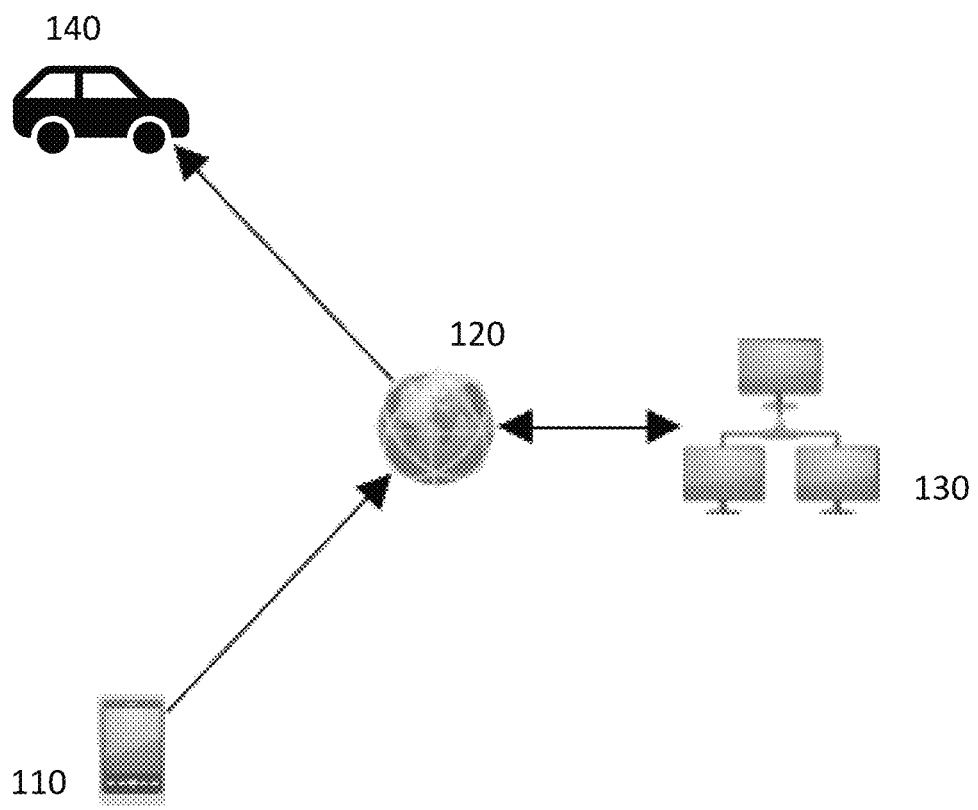
FIG. 1 is a block diagram of a rideshare request process.

According to an embodiment as shown in FIG. 1, a user requests a rideshare trip through a rideshare application on a user device 110 which contacts a rideshare provider 130 over the Internet 120 or an equivalent network. The rideshare provider 130 assigns a rideshare vehicle 140 to provide the rideshare trip. Based on the user's location and provided destination location, a pickup location is designated where the user meets the rideshare vehicle 140 for their designated rideshare trip.

Figure 2:
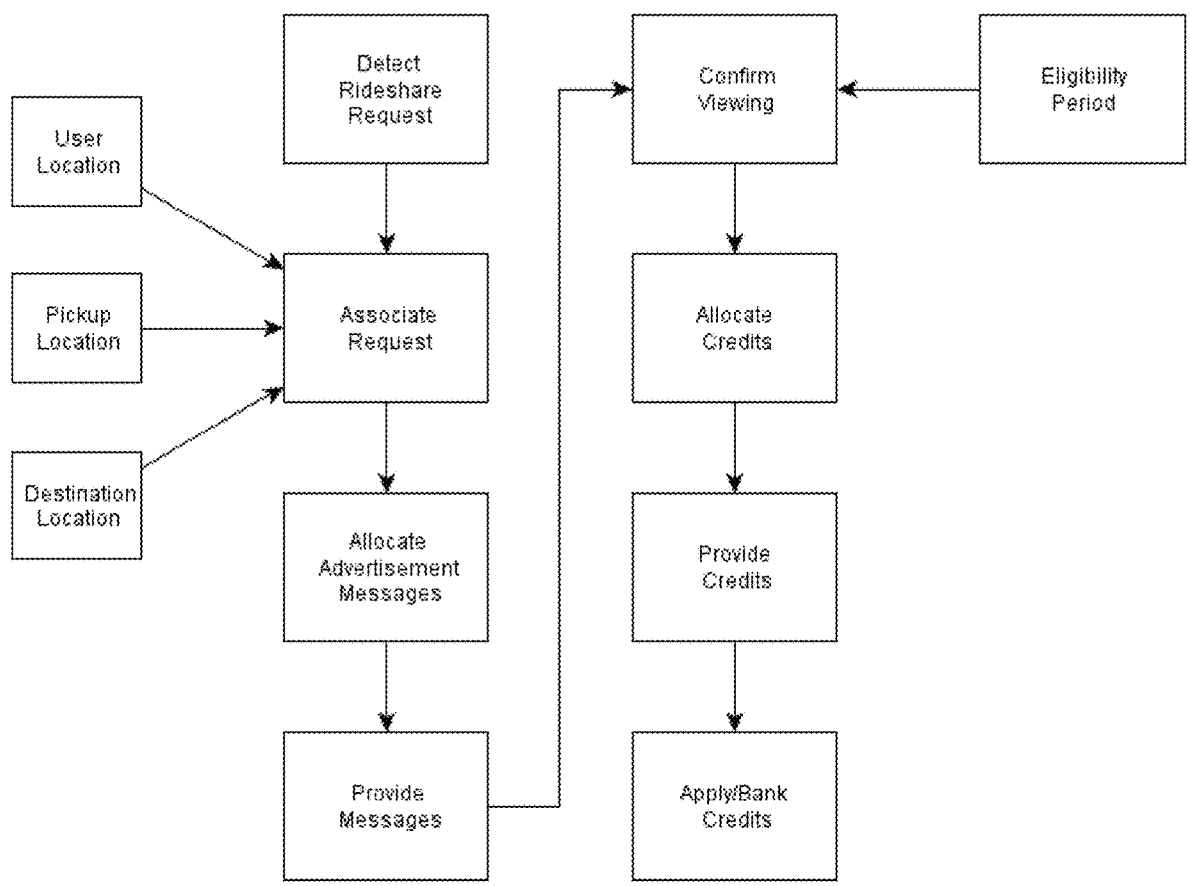
FIG. 2 is a block diagram of a method of providing reward credits according to an embodiment.

When the user requests the rideshare trip, the rideshare rewards application detects the rideshare request through a notification as shown in FIG. 2. Upon notification, the rewards application receives rideshare trip information, including the user's location, the pickup location and the destination location. Additionally, the rewards application may further receive the identity of the rideshare provider and/or a specific destination vendor (e.g. restaurant, store, event center, etc.) and/or destination event (concert, sporting event, etc.). The rideshare request, with the accompanying data, is then associated with the user.

Using the rideshare trip information, the rewards application connects to an advertising message database, and allocates one or more advertising messages based on the rideshare trip information. Each advertising message preferably has at least one element (merchant, product, location, service) that relates to at least one element of the rideshare trip information. Where multiple advertising messages are selected, they may be queued into an order for delivery, either at random or based on one or more predetermined criteria.

With the advertising messages selected, the rewards application waits for a notification that the user has arrived at the pickup location. As shown in FIG. 2, once the rewards application receives the notification, it then arranges for the selected advertising messages to be provided to the user's device for viewing. The user may then view the selected advertisements on the user device during the rideshare trip. As each advertisement is viewed, a viewing confirmation notification is sent to the rewards application.

When the user arrives at the destination location, the rewards application receives a notification that the rideshare trip is completed. The rewards application then allocates the amount of rideshare credits earned by the user according to the advertisements viewed as shown in FIG. 2. The allocated credits are then provided to the user via the rewards application.

The rideshare credits may then be applied immediately to the charge for the current rideshare trip or saved for use with a future trip. Alternatively, the rideshare credits may be stored in a rideshare credit bank for future use. Similarly, stored rideshare credits (e.g. from previous trips) may also be applied to the current rideshare trip.

Rideshare credits are preferably awarded as kilometers (or miles, as applicable). The rideshare credits are then used by deducting the kilometer amount of used rideshare credits from the kilometer distance of the rideshare trip to create an adjusted rideshare distance. This adjusted rideshare distance is then used to calculate the charge owed by the user for the rideshare trip.

Rideshare credits may further be converted into other monetary or non-monetary rewards, at a rate of exchange set by the rewards application. The rate of exchange may be fixed or variable depending on the nature of the rewards.

The rewards application preferably operates as a stand-alone application on the user's device. However, the rewards application may also be accessed from triggers or requests within the rideshare provider's application, if desired and subject to approval from the rideshare provider. Thus, the user may open the rewards application and be prompted to select a rideshare provider, based on applications known to be present on the user's device or according to agreement with the rideshare providers to provide information. Alternatively, the user may open the rideshare provider application and then be prompted to open the rewards application, again either through detection of the presence of the rewards application on the user's device or by arrangement with the rideshare provider. Finally, as noted above, the rewards application may be capable of interacting with multiple different rideshare provider and their applications, and may provide rewards and rideshare credits accordingly.

A destination vendor may be determined from the destination location, through GPS or known maps, or by other means. The destination vendor may be identified as a specific vendor, such as a specific restaurant, store or service provider offering specific services. The destination vendor may also be a specific vendor providing variable services, such as an arena or community center. Finally, the destination vendor by be a general vendor for other specific vendor or services, such as a mall (indoor or outdoor), or a fairground.

Determination of a destination event may also be made from analysis of the destination location and/or destination vendor (e.g. mall, restaurant) or by combining the destination location and/or destination vendor with external data. For example, if the destination location is an arena, the arena's website may be polled to determine what event is taking place (e.g. a concert) and associated to determine that the user is attending the event. Similarly, if permission is granted, the user's calendar information may be used to determine the event. For example, if the destination location is a residential address, and the user's calendar has an event "Bob's Birthday Party" for that time and/or location, the association may be made that the user is attending a birthday party.

Accordingly, the advertising messages may then tailored to the user based on the destination vendor or event, in addition to other information. If the destination vendor is a restaurant, the advertising messages may be for the restaurant itself, promoting menu items or attractions, or may be for proximate locations offering activities that may be of interest (e.g. bars, night clubs) which may or may not be affiliated with the restaurant. If the destination event is an arena event, such as a concert, the advertising messages may be for future events at the arena, or for merchandise related to the present event. A destination such as a hospital or medical building may lead to commercial advertising messages such as insurance, as well as non-commercial advertising messages in the form of government public service announcements (PSAs).

Additionally, or alternatively, advertising messages may include content related to the larger city or region of the destination location, such as political messages (national or regional), regional events (festivals, conferences) and regional services for either residents or tourists, again tailored to the user.

The advertising messages are preferably visual, and may be video or still images, with or without an audio component. The advertising message may also have a fixed display duration, preferably 15 or 30 seconds. The display area of the advertising message may cover all or a portion of the display area of the user's device, and may further be re-sized or similarly adjusted according to the display parameters of the user's device. Advertising messages may be commercial in nature, or may be from non-profit (charity) or government organizations.

Figure 3:
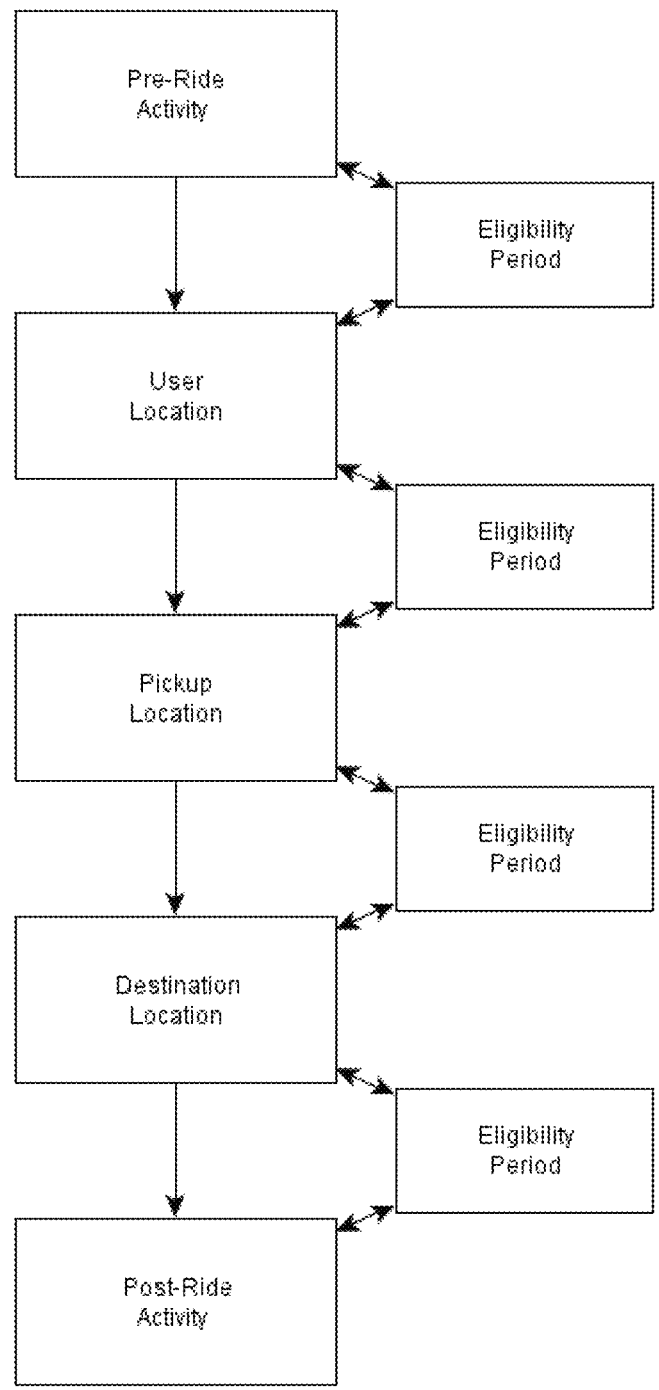
FIG. 3 is a block diagram of a process of determining eligibility periods according to the method of FIG. 2.

In order to received rideshare credits from the rewards application, the advertising messages must be viewed during a defined eligibility period as shown in FIG. 3. By default, this eligibility period is defined as the duration of the rideshare trip, as determined by the user's arrival and pickup at the pickup location, and subsequent arrival at the destination location. However, other eligibility periods may also be defined and applied. For example, the beginning of the eligibility period may be triggered at the user's location when the rideshare trip is requested, so that the user may be provided with advertisements while waiting for pickup and earn rewards during that period.

Additionally, other eligibility periods may be created and presented to the user as an opportunity to earn rideshare credits without ordering a rideshare trip. For example, an eligibility period may be created to coincide with a promotion for an upcoming event (e.g. a concert announcement) or in conjunction with one or more of the rideshare providers. These additional eligibility periods may take place either before or after the rideshare trip as shown in FIG. 3.

Further, each eligibility period may be defined with its own rideshare credits reward and redemption rates and policies. For example, eligibility periods before the rideshare trip starts may have a lower rewards rate than eligibility periods during rides. Or rideshare credits earned during an eligibility period affiliated with a rideshare provider may be redeemed at a higher rate with that provider.

The rideshare credits are preferably a form of scrip currency as defined by the rewards application, generally with some cooperation with one or more of the rideshare provides. As discussed above, the rideshare credits preferably have a kilometer (mile) or kilometer-equivalent value which may then be deducted from the rideshare trip distance to determine the amount owed for the rideshare trip. As further discussed above, the rideshare credits may be defined as having a monetary-equivalent value, or some other form of defined value. Furthermore, rideshare credits may be universal for use with any rideshare provider, or may be tied to a specific rideshare provider based on how they were earned. In the latter case, there may further be an option to convert specific rideshare credits to universal rideshare credits and vice versa, generally at a reduced value. If permitted, rideshare credits may also be exchanged between users, potentially with a fee or rate reduction applied.

Additionally, the rideshare credits may be applied to non-rideshare rewards, at the rideshare credit provider's discretion, and at a greater or lesser redemption rate. Non-rideshare rewards may include contest entries, monetary rewards, merchandise rewards, or other rewards as known in the art. Similarly, other types of rewards credits held by the user may be converted to rideshare credits, if permitted by the rideshare credit provider.

As described, the advertising messages and rideshare credits are associated with the user who placed the rideshare request. If multiple people travel on a single rideshare trip, only the user who is associated with the rideshare request may collect rewards. However, some rideshare services allow for a second user to request a ride and be collected during an ongoing rideshare trip. In these cases, if a second (or additional) user places a rideshare request and the request is fulfilled by an ongoing rideshare trip, the second user (or additional users) may also be eligible to view advertising messages and receive rideshare credits, on the basis that the second user placed their own rideshare request and has their own rewards application and account.

It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A method of calculating rideshare credit mounts based on advertising message content and duration, comprising:

detecting a request by the user for the ridesharing trip provided by a rideshare provider sent from a user device;

associating, with the request, a user location, a pickup location and a destination location;

allocating one or more advertisement messages to the user, with content and duration of the advertisement messages based on at least one of the user location, the pickup location and the destination location;

providing the one or more advertisement messages to the user for viewing on the user device during an eligibility period, the eligibility period comprising at least one of: a designated time period before the rideshare trip and a designated time period after the rideshare trip;

receiving confirmation that the user has viewed at least one of the one or more advertisement messages during the eligibility period;

calculating a rideshare credit amount based on the advertisement messages and the eligibility period wherein the rideshare credit amount is a travel distance measurement which is then deducted from the rideshare trip distance to determine an adjusted final monetary amount owed by the user for the rideshare trip; and providing the rideshare credit amount to the user, wherein the eligibility period includes the duration of the rideshare trip.

2. The method of claim 1, wherein the rideshare credit amount is allocated for use solely with the rideshare provider.

3. The method of claim 1, where the rideshare credit amount can be exchanged for another rideshare credit amount for use with another rideshare provider.

4. The method of claim 1, wherein the eligibility period further comprises the user's travel time from the user location to the pickup location.

5. The method of claim 1, wherein the designated time period after the rideshare trip is determined by the rideshare provider.

6. The method of claim 1, further including applying the rideshare credit amount to the rideshare trip at the time the rideshare credit amount is provided.

7. The method of claim 1, where the rideshare credit amount is stored in a credit bank associated with the user.

8. The method of claim 2, wherein the rideshare credit amount is stored in a credit bank associated with the user and the rideshare provider.

9. The method of claim 1, further comprising:

detecting a second request from a second user for a second rideshare trip;

associating, with the second request, a second user location, a second pickup location and a second destination location;

allocating one or more advertisement messages based on at least one of the second user location, the second pickup location and the second destination location;

providing the one or more advertisement messages to the second user for viewing on a second user device during an eligibility period;

receiving confirmation that the second user has viewed at least one of the one or more advertisement messages during the eligibility period;

calculating a rideshare credit amount based on the advertisement messages and the eligibility period; and providing the rideshare credit amount to the second user, wherein the eligibility period includes the duration of the second rideshare trip, and wherein the second rideshare trip is partially overlapping with the rideshare trip and is fulfilled by the same rideshare vehicle.

10. The method of claim 9, where the rideshare trip and the second rideshare trip share one of a common pickup location and a common destination location.

11. A system for calculating rideshare credit mounts based on advertising message content and duration, comprising:

a software application, the software application operative to:

detect a request by the user from a user device for the ridesharing trip provided by a rideshare provider;

associate, with the request, a user location, a pickup location and a destination location;

allocate one or more advertisement messages to the user, with content and duration of the advertisement messages based on at least one of the user location, the pickup location and the destination location;

provide the one or more advertisement messages to the user for viewing on the user device during an eligibility period, the eligibility period comprising at least one of: a designated time period before the rideshare trip and a designated time period after the rideshare trip;

receive confirmation that the user has viewed at least one of the one or more advertisement messages during the eligibility period, the eligibility period including the duration of the rideshare trip;

calculate a rideshare credit amount based on the advertisement messages and the eligibility period wherein the rideshare credit amount is a travel distance measurement which is then deducted from the rideshare trip distance to determine an adjusted final monetary amount owed by the user for the rideshare trip; and provide the rideshare credit amount to the user, an advertising message database storing the one or more advertisement messages; and one or more user credit banks, each user credit bank operative to store rideshare credit amounts associated with each user.

12. The system of claim 11, wherein the rideshare credit amount is allocated solely for use with the rideshare provider.

13. The system of claim 11, wherein the eligibility period further comprises the user's travel time from the user location to the pickup location.

14. The system of claim 11, wherein the rideshare credit amount may be applied to the rideshare trip at the time the rideshare credit amount is provided.

15. The system of claim 11, wherein each user credit bank further comprises one or more rideshare credit banks each of the rideshare credit banks associated with a specific rideshare provider.

16. The system of claim 11, wherein the rideshare credit amount is convertible into a non-monetary reward.

17. The system of claim 16, wherein the non-monetary reward is associated with the advertising content.

* * * * *